US012584365B2

(12) United States Patent
    Catalano et al.

(10) Patent No.:  US 12,584,365 B2
(45) Date of Patent:       Mar. 24, 2026

(54) SEALING RING AND JOINT FOR OIL DRILLING PLANT

(71) Applicant: MECCANOTECNICA UMBRA S.P.A., Campello sul Clitunno (IT)

(72) Inventors: Ignazio Catalano, Campello sul Clitunno (IT); Massimiliano Borasso, Campello sul Clitunno (IT)

(73) Assignee: MECCANOTECNICA UMBRA S.P.A., Campello Sul Clitunno (IT)

( * ) Notice: Subject to any disclaimer, the term of this patent is extended or adjusted under 35 U.S.C. 154(b) by 0 days.

(21) Appl. No.: 18/712,603

(22) PCT Filed: Nov. 24, 2022

(86) PCT No.: PCT/IB2022/061380
    § 371 (c)(1),
    (2) Date: May 22, 2024

(87) PCT Pub. No.: WO2023/100039
    PCT Pub. Date: Jun. 8, 2023

(65) Prior Publication Data
    US 2025/0012162 A1      Jan. 9, 2025

(30) Foreign Application Priority Data
    Dec. 3, 2021     (IT) ........................ 102021000030689

(51) Int. Cl.
    *E21B 33/02*       (2006.01)
    *E21B 21/01*       (2006.01)
    *F16J 15/3204*    (2016.01)

(52) U.S. Cl.
    CPC .............. *E21B 33/02* (2013.01); *E21B 21/01* (2013.01); *F16J 15/3204* (2013.01)

(58) Field of Classification Search
    CPC .............. E21B 33/00–085; E21B 21/02; F16J 15/16–43; F16L 27/082
    See application file for complete search history.

(56) References Cited

U.S. PATENT DOCUMENTS

| | | | |
|---|---|---|---|
| 2,536,292 A | 1/1951 | Kollsman | |
| 3,695,789 A | * 10/1972 | Jansson ................. | F01C 21/003 |
| | | | 418/133 |
| 5,316,455 A | 5/1994 | Yoshimura et al. | |
| 6,446,976 B1 | 9/2002 | Key et al. | |
| 6,969,071 B2 | 11/2005 | Berard | |

(Continued)

FOREIGN PATENT DOCUMENTS

| | | |
|---|---|---|
| CN | 105156050 A | 12/2015 |
| EP | 0156612 A2 | 10/1985 |

(Continued)

OTHER PUBLICATIONS

International Search Report for International Patent Application No. PCT/IB2022/061380, mailed Mar. 30, 2023.

*Primary Examiner* — Kristyn A Hall
(74) *Attorney, Agent, or Firm* — Armstrong Teasdale LLP

(57) ABSTRACT

A sealing ring for a joint of an oil drilling station that has a flat annular contact region provided with a plurality of circumferentially arranged grooves is provided. Each groove has a predetermined radial extension on the contact region and is axially lowered and accessible from an inner side face of the sealing ring.

18 Claims, 8 Drawing Sheets

(56)                    References Cited

U.S. PATENT DOCUMENTS

| 7,789,161 B2 | 9/2010 | Riley et al. | |
|---|---|---|---|
| 2003/0051883 A1 | 3/2003 | Seneviratne | |
| 2004/0046322 A1* | 3/2004 | Berard ................. | F16J 15/3464 |
| | | | 277/405 |
| 2022/0074276 A1* | 3/2022 | Webber .............. | E21B 23/0413 |

FOREIGN PATENT DOCUMENTS

| EP | 0870956 A1 | 10/1998 |
|---|---|---|
| EP | 1630347 A1 | 3/2006 |
| EP | 3009717 A1 | 4/2016 |
| FR | 1238826 A | 8/1960 |
| WO | 2015022667 A2 | 2/2015 |

* cited by examiner

40

4002

Z

4004

Z

70

7004

7000

7014

7012

7010

7008

7009

7016

7006

7001

7002

Z

Z

SEALING RING AND JOINT FOR OIL DRILLING PLANT

CROSS-REFERENCE TO RELATED APPLICATIONS

This application is a National Phase Application of PCT International Application No. PCT/IB2022/061380, having an International Filing Date of Nov. 24, 2022, which claims priority to Italian Application No. 102021000030689, filed Dec. 3, 2021, each of which is hereby incorporated by reference in its entirety.

TECHNICAL FIELD

The present invention belongs to the sector of components for oil drilling plants; in particular, the present invention relates to a sealing ring and a joint for the connection between the stationary duct and the rotating pipe of a drilling station of an oil plant.

BACKGROUND OF THE INVENTION

There are many solutions for drilling station joints. Some solutions are illustrated, for example, in documents EP156612, EP1630347, EP3009717, U.S. Pat. Nos. 6,969, 071, 7,789,161, US-A1-2003/051883 and CN105156050. Further examples are illustrated in documents U.S. Pat. No. 5,316,455, EP0870956, U.S. Pat. Nos. 3,695,789, 6,446, 976, FR1238826 and U.S. Pat. No. 2,536,292. A further solution is also illustrated in document WO-A2-2015/ 022667 in the name of the Applicant.

In a drilling station, a rotating drilling head operates at the bottom of the well and is supported by a drilling pipe, rotating together with the drilling head, which emerges to the surface. The drilling pipe is connected to a stationary duct by means of a joint. The stationary pipe is supplied with drilling mud by means of a pump.

The drilling mud has many essential functions. Among other things, it is essential for lubricating and cooling the drilling head which otherwise, by heating up due to friction with the rock, would quickly break. Water-based muds are usually used which are substantially composed of clay, mainly bentonite, or are based on water and special polymers or emulsion of mineral oil and water. Currently, for various reasons, including environmental impact, the use of water-based muds has become predominant.

This, however, causes some technical drawbacks, such as increased wear between the stationary parts and the moving parts of the connection joint between the drilling pipe and the stationary duct, since water-based muds have a lower lubricating capacity than that of other types.

Consequently, a decrease in the life of these joints has been observed which, when they break, need to be replaced when the drilling station is stopped, with obvious economic consequences.

OBJECT OF THE INVENTION

The object of the present invention is to provide a sealing ring and a joint for a drilling station of an oil plant which meet the requirements of the field and overcome the aforementioned drawbacks.

Said object is achieved by a sealing ring as described and claimed herein. Additional advantageous embodiments of the present invention are also described.

BRIEF DESCRIPTION OF THE DRAWINGS

The features and advantages of the sealing ring and of the joint according to this invention will become apparent from the following description, given by way of non-limiting example according to the figures in the accompanying drawings, wherein.

DETAILED DESCRIPTION

Figures 1, 2:
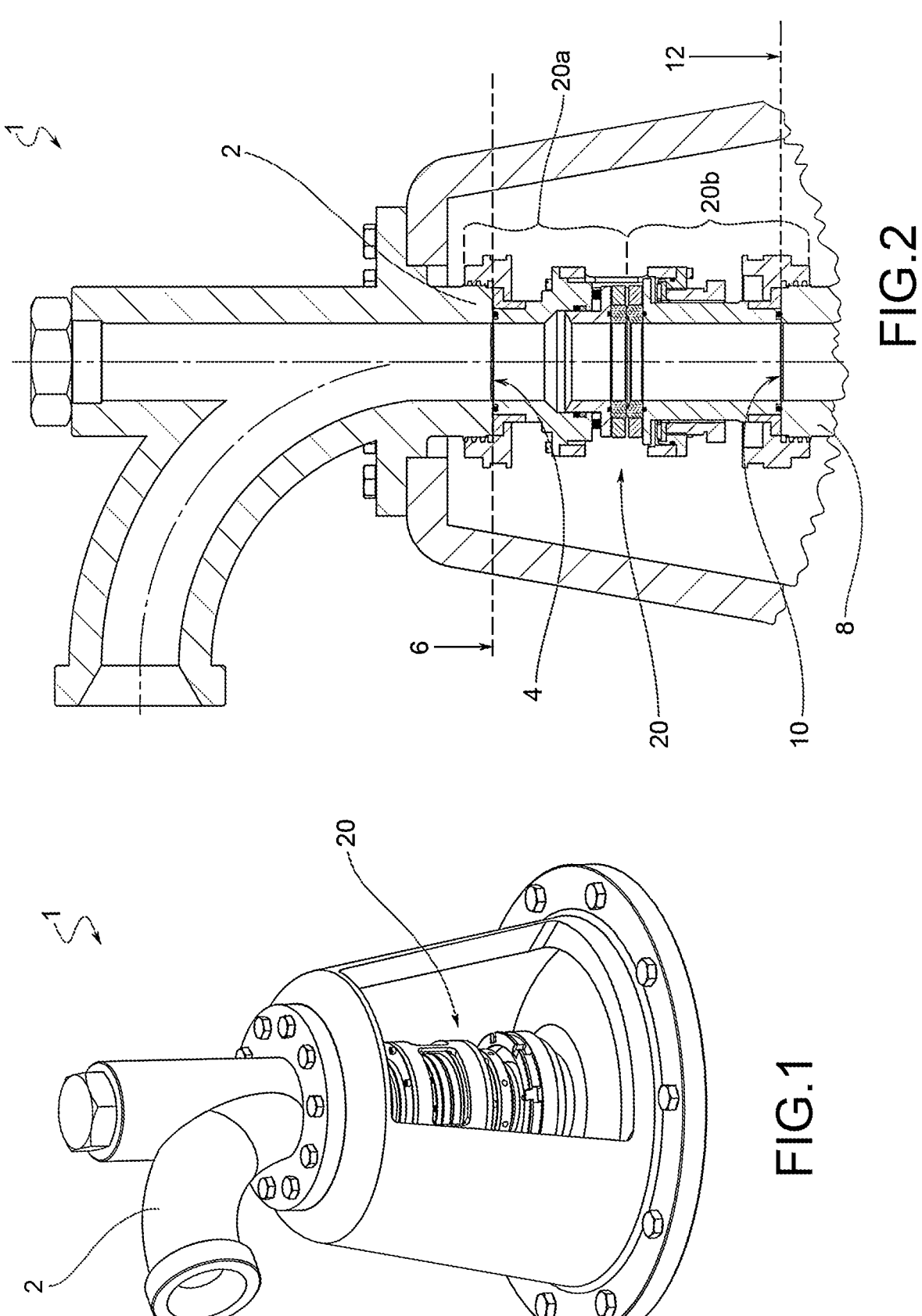
FIG. 1 shows a drilling assembly, comprising a stationary duct, a rotating pipe and a joint applied thereto.
FIG. 2 is a longitudinal cross-sectional view of the assembly of FIG. 1.

With reference to the figures of the accompanying drawings, reference numeral 1 indicates as a whole an assembly comprising a stationary duct 2 for the entry of the drilling mud, ending with a stationary mouth 4 lying on an imaginary upper plane 6, a rotating pipe 8 for feeding the drilling mud to a drilling head, having a rotating mouth 10 lying on an imaginary lower plane 12, and a joint 20 connected above to the stationary duct 2 and below to the rotating pipe 8, coaxially thereto, to obtain mud-tight fluid communication between the stationary mouth 4 and the rotating mouth 10.

The joint 20 extends along a main axis Z which, when the joint is correctly mounted to the stationary duct 2 and to the rotating pipe 8, is coaxial therewith. The joint 20 comprises a stationary half-joint 20a, fixed to the stationary duct, and a rotating half-joint 20b, fixed to the rotating pipe.

According to a preferred embodiment, the stationary half-joint 20a comprises a threaded upper connection flange 22 for screwing to the stationary duct 2, an upper sleeve 24 and preferably an upper connection flange 26, engaged with the connection flange 22 and fixed to the upper sleeve 24.

The upper sleeve 24 extends axially between an upper face 28 and a lower face 34, which are orthogonal to the main axis Z and axially spaced.

On the upper face 28, a first seat 30 is obtained in which a first O-ring 32 is housed. When the joint 20 is fixed to the stationary duct 2, the edge delimiting the stationary mouth 4 rests against the connection flange 26 and the upper face 28 of the sleeve 24, compressing the O-ring 32.

The stationary half-joint 20a also comprises an upper support 36, in the shape of a cup, sealingly sliding inside the upper sleeve 24 and protruding therefrom on the side of the lower face 34. In particular, the upper support 36 comprises an axial support wall 37 having an axial extension, mainly housed in the upper sleeve 24, and a radial support wall 38 having a mainly radial extension, protruding from one end of the axial support wall 37 and placed outside of the upper sleeve 24.

Preferably, the axial support wall 37, at the free end, opposite to that of the radial support wall 38, has an annular lead surface 37a, flared towards the radial support wall 38.

Advantageously, such configuration facilitates the discharge of the drilling mud, especially in stationary conditions of the station.

The stationary half-joint 20a further comprises at least one spring 39, preferably a plurality of springs 39 in compression between the upper sleeve 24 and the upper support 36, and in particular between the lower face 34 of the upper sleeve 24 and the support wall 38 of the upper support 36. Said springs 39, preferably arranged circumferentially, operate in moving the support wall 38 away from the lower face 34 to axially lengthen the joint and to ensure contact and sealing between a stationary sealing ring and a rotating sealing ring, which will be discussed hereinafter.

The stationary half-joint 20a further comprises a stationary sealing ring 40, on board the upper support 36. For example, the stationary ring 40 is supported on the outer side surface by a stationary ring holder 42, which is in turn fixed to the upper support 36 by means of screws 43 and pins 44. For example, the stationary ring 40 is hot-driven into the stationary ring holder 42.

Advantageously, the screws 43 allow the stationary ring 40 to be held axially locked against the upper support 36 (also following long periods of operation of the station, canceling the detachment effect which would cause considerable vibrations), keeping a third O-ring 41 in compression between the stationary ring 40 and the upper support 36 and preventing the stationary ring from detaching from the O-ring. Should this occur, the mud pressure may shear the O-ring.

Advantageously, moreover, the flared shape of the lead surface 37a suitably conveys the thrust of the fluid pressure, and facilitates the contact between the stationary ring and the third O-ring 41, ultimately improving the seal.

The rotating half-joint 20b instead comprises a threaded lower connection flange 52 for screwing to the rotating pipe 8, a lower sleeve 54 and preferably a lower connection flange 56, engaged with the connection flange 52 and fixed to the lower sleeve 54.

The lower sleeve 54 extends axially between a lower face 58 and an upper face 64, which are orthogonal to the main axis Z and axially spaced.

On the lower face 58, a second seat 60 is obtained in which a second O-ring 62 is housed. When the rotating half-joint 20b is fixed to the rotating pipe 8, the edge delimiting the rotating mouth 10 rests against the connection flange 56 and the lower face 58 of the lower sleeve 54, compressing the O-ring 62.

Preferably, the upper face 28 of the upper sleeve 24 and the lower face 58 of the lower sleeve 54 have no axial projections which form centering surfaces for assembling the stationary duct and the rotating pipe. Advantageously, this allows the joint to be disassembled from the stationary duct and from the rotating pipe even in the event of a malfunction of the adjustment mechanism of the axial length of the joint, which will be discussed below; in fact, in the event of a malfunction of said mechanism, it is sufficient to unscrew the upper connection flange and the lower connection flange and withdraw the joint.

The rotating half-joint 20b further comprises a rotating sealing ring 70, on board the lower sleeve 54. For example, the rotating ring 70 is supported on the upper face 64 of the lower sleeve 54 by a rotating ring holder 72, which is in turn fixed to the lower sleeve 54 by means of screws 73 and pins 74. For example, the rotating ring 70 is hot-driven into the rotating ring holder 72.

Advantageously, the screws 73 allow the rotating ring 70 to be held axially locked against the lower sleeve 54 (also following long periods of operation of the station, canceling the detachment effect which would cause considerable vibrations), keeping a fourth O-ring 71 in compression between the rotating ring 70 and the lower sleeve 54 and preventing the stationary ring from detaching from the O-ring. Should this occur, the mud pressure may shear the O-ring.

The rotating ring 70 is permanently in contact with the stationary ring 40, in a condition of mutual sliding and sealing against the drilling mud escaping, also by virtue of the action of the springs.

The joint 20 further comprises an annular skirt 80, coaxial to the main axis Z, which extends from the stationary half-joint 20a to the rotating half-joint 20b, straddling the contact area between the stationary ring 40 and the rotating ring 70, radially externally to the upper sleeve 24 and to the lower sleeve 54.

The skirt 80 comprises an upper portion 82 at the upper sleeve 24, fixed to said upper sleeve 54, for example by means of screws 84 and a lower portion 86 at the lower sleeve 54. The lower portion 86 supports a compression ring 90, the axial position of which is adjustable by rotation.

For example, the joint 20 comprises an internally threaded closing flange 88, integral with the skirt 80, for example fixed to the lower portion 86 of the skirt, and the compression ring 90, externally threaded, is screwable to and removable from the compression ring 90, thus modifying its axial position.

The compression ring 90 operates on the lower sleeve 54, counteracting the action of the springs 39, for example through a bearing holder ring 92, directly in contact with the compression ring 90, and a rolling bearing 94, for example a roll or roller cage, placed between the bearing holder ring 92 and the lower sleeve 54.

Figure 3:
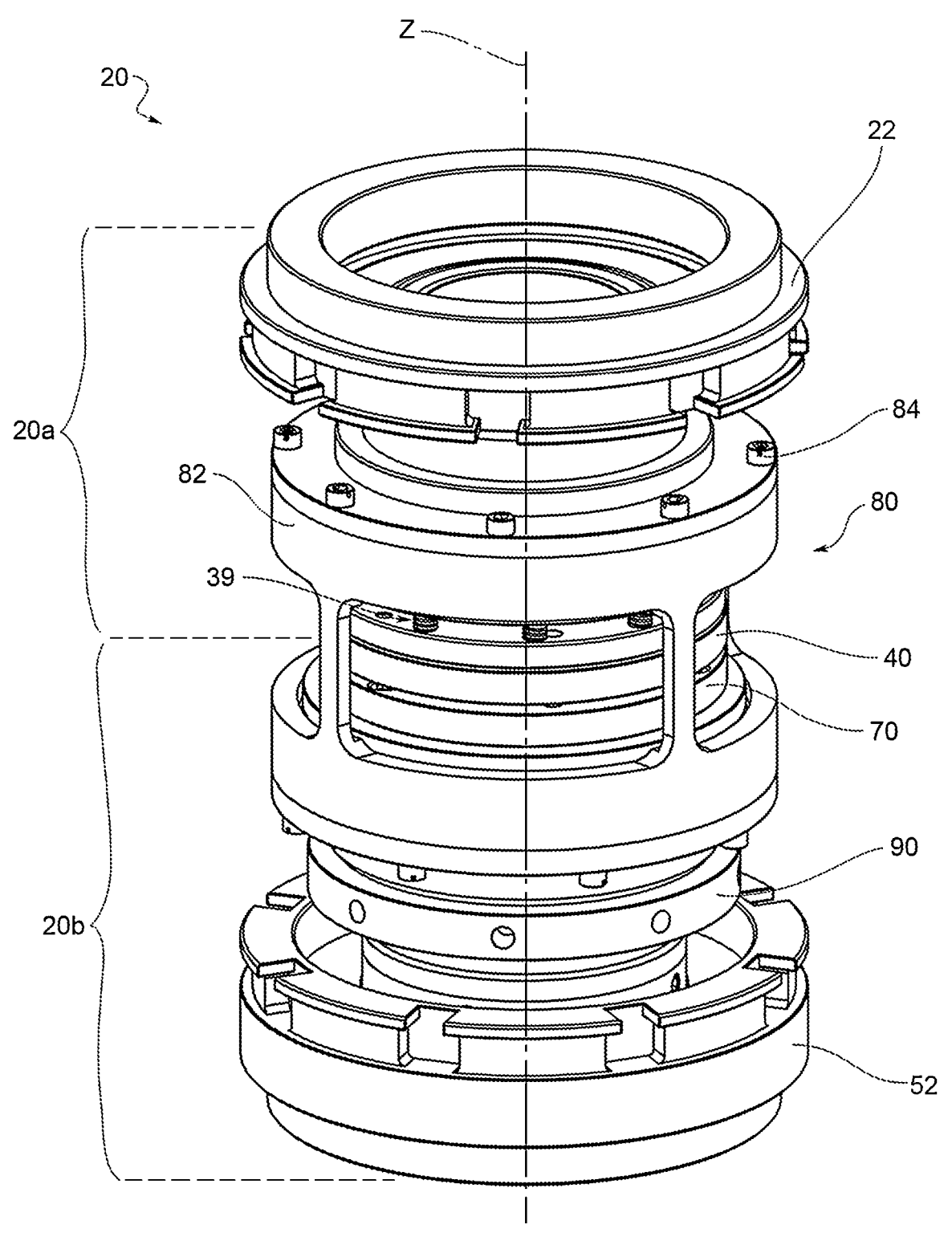
FIG. 3 illustrates a joint according to an embodiment of this invention, in an extension configuration or working configuration.
Figure 4:
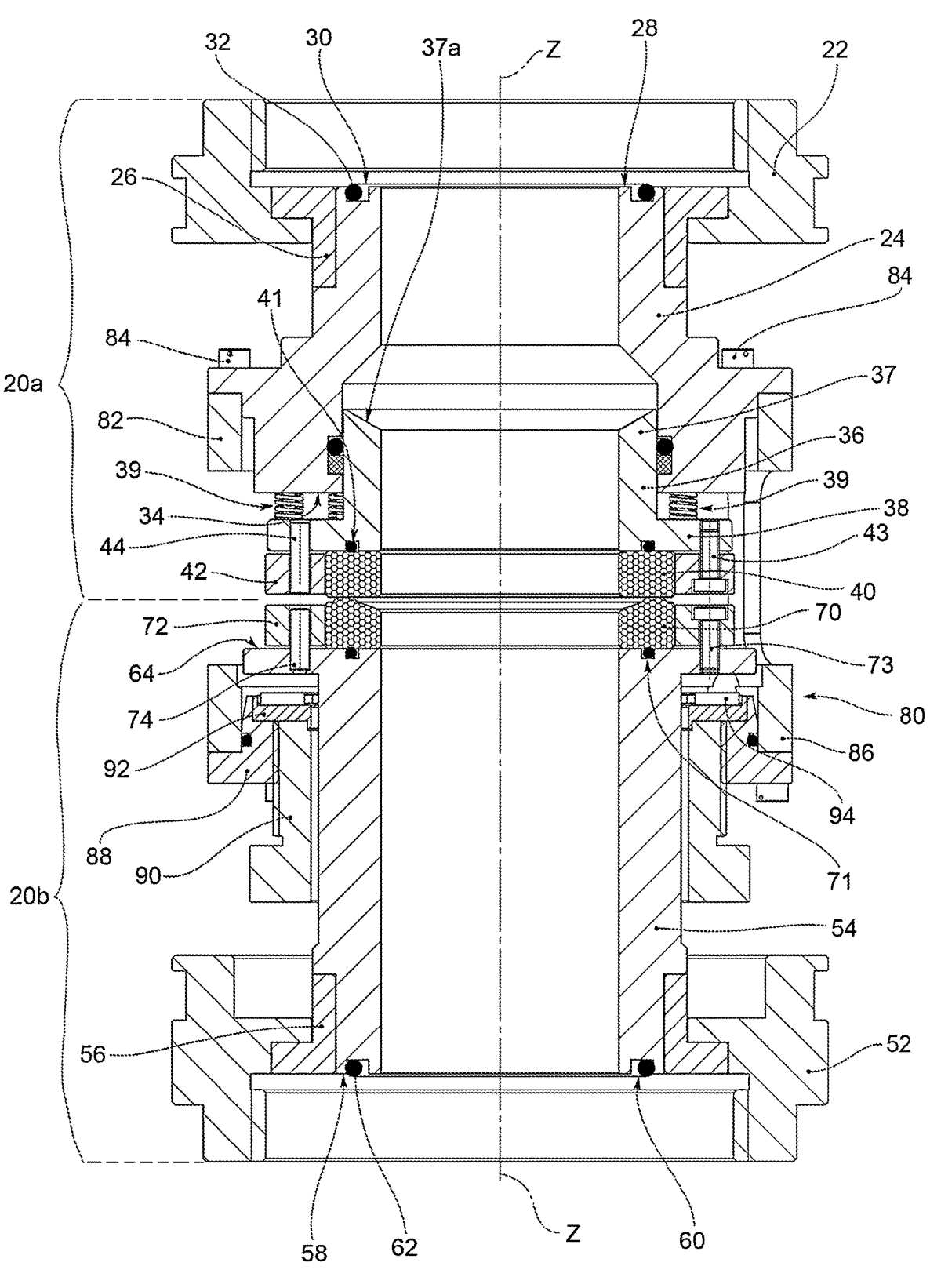
FIG. 4 is a longitudinal cross-sectional view of the joint of FIG. 3.
Figure 5:
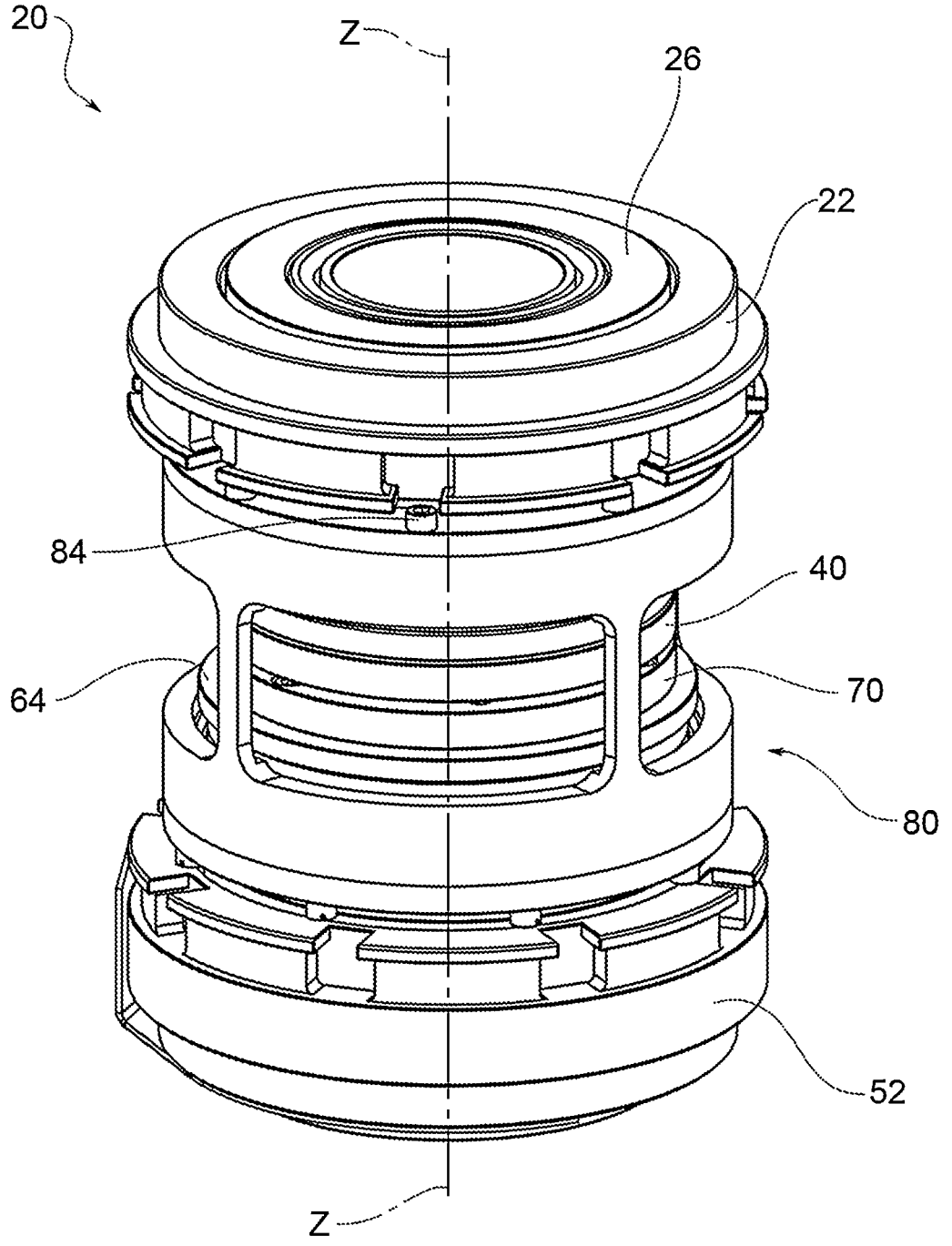
FIG. 5 illustrates the joint in a minimum length configuration or assembly configuration.
Figure 6:
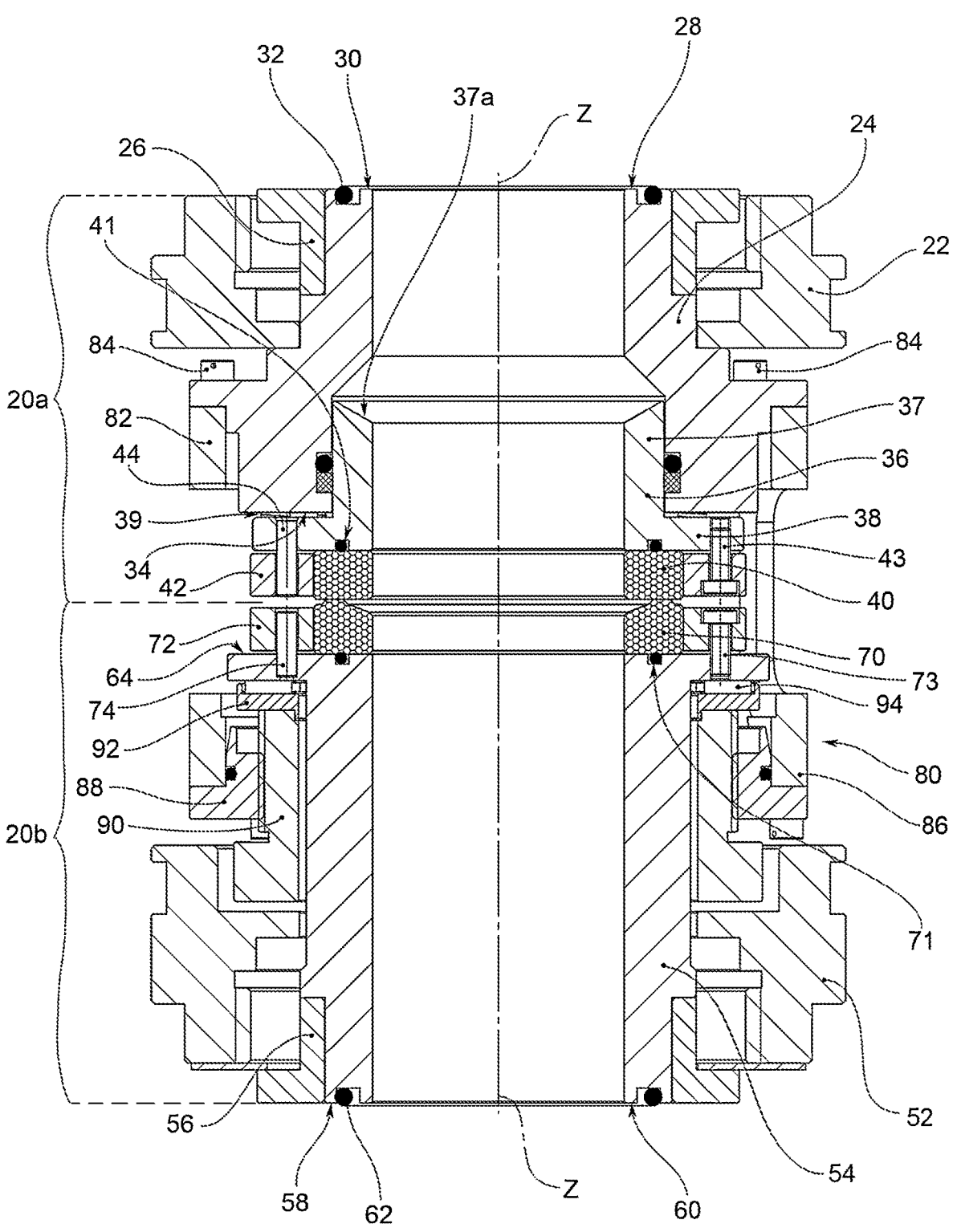
FIG. 6 is a longitudinal cross-sectional view of the joint of FIG. 5.

The joint 20 is thus adapted to switch from a configuration of minimum length or assembly (FIGS. 5 and 6; joint completely shortened), in which the springs 39 are at maximum compression, the axial distance between the upper face 28 of the upper sleeve 24 and the lower face 58 of the lower sleeve 54 is minimal and the compression ring 90 is in the maximum screwing configuration, to an extension or working configuration (FIGS. 3 and 4; stretched joint), in which the springs 39 are compressed (but less than in the assembly configuration), the upper face 28 of the upper sleeve 24 and the lower face 58 of the lower sleeve 54 are spaced apart (more than in the assembly configuration) and the compression ring 90 is screwed (but less than in the assembly configuration).

The axially sliding upper support 36, the springs 39, the skirt 80, the closing flange 88, the compression ring 90, the bearing holder ring 92 and the rolling bearing 94 therefore create an example of an adjustment mechanism suitable for shortening and lengthening the distance between the upper face 28 and the lower face 58 of the joint 20.

In the minimum length configuration, the joint 20 is mountable between the upper surface 6 and lower surface 12, while in the normal operating condition, fixed to the stationary duct 2 and to the rotating pipe 8, it is in the extended configuration.

The stationary ring 40 and the rotating ring 70 are made in a single piece, preferably in a material and through a process which may ensure a high hardness, generally greater than 60 HRC. For example, the ring is made of a metal material, for example AISI 400 stainless steel, obtained by molding and machining by chip removal. According to further variants, the ring is made of ceramic material, such as Widia or silicon carbide, obtained by sintering of powders.

Figures 7, 8:
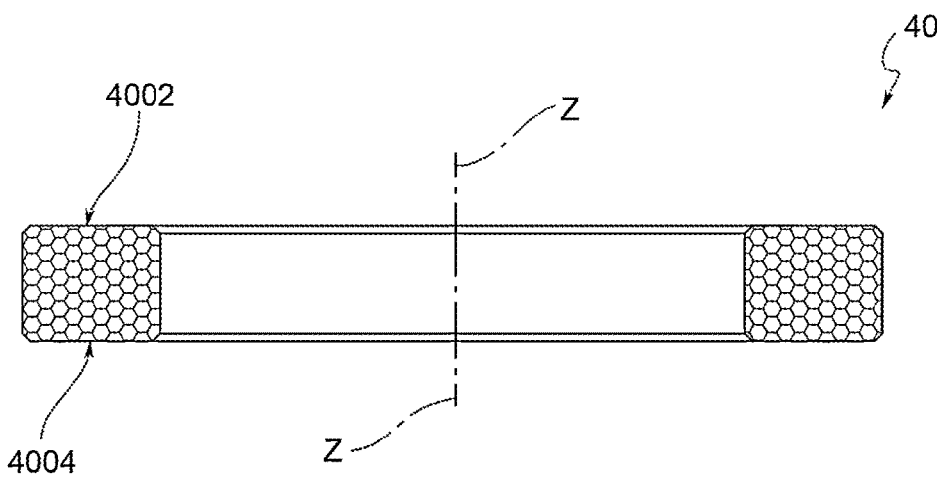
FIG. 7 is a cross-sectional view of a stationary sealing ring, according to an embodiment of this invention.
FIG. 8 shows a rotating sealing ring, according to an embodiment of this invention.
Figures 9, 10:
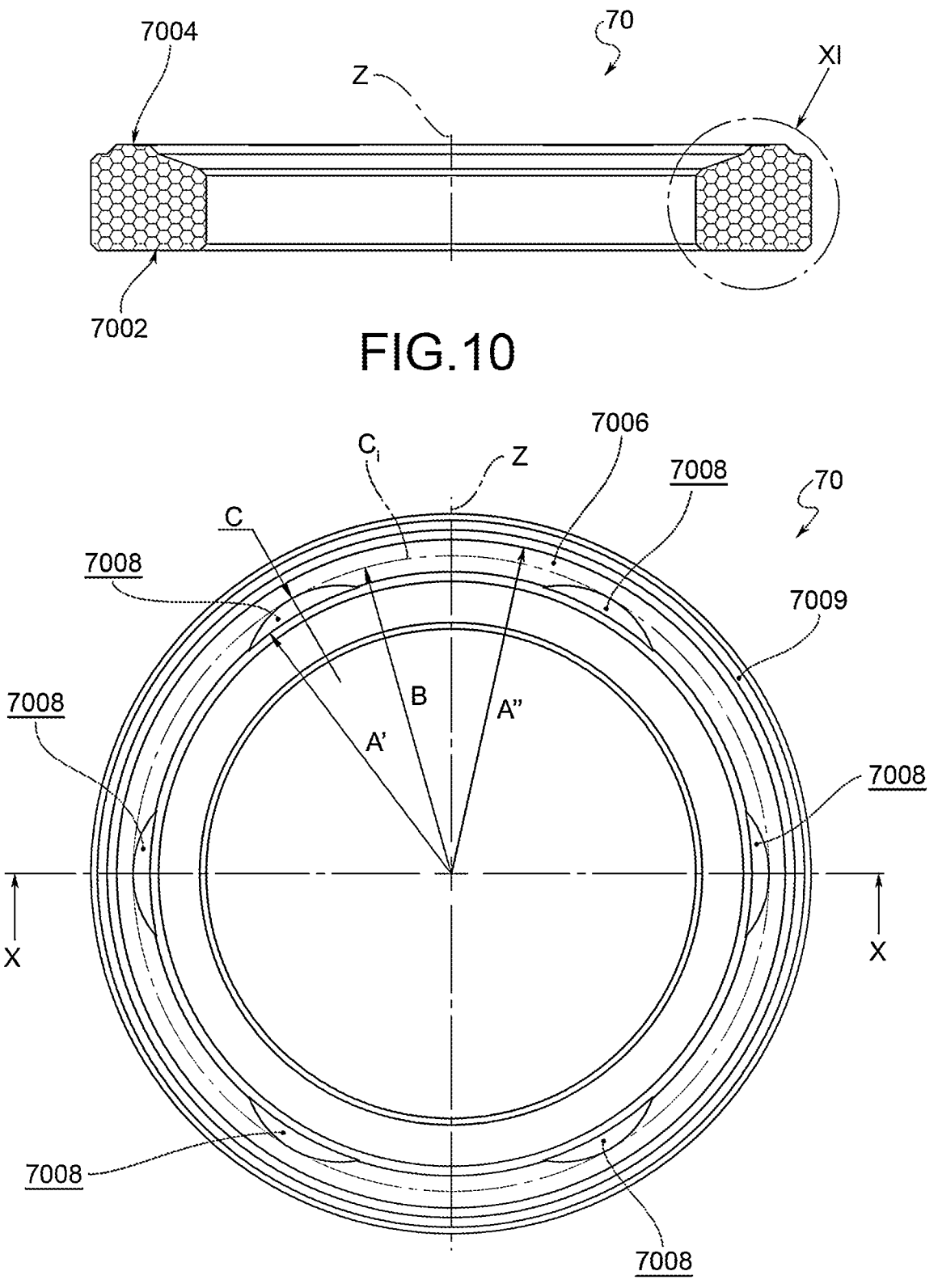
FIG. 9 is a plan view of the rotating ring of FIG. 8.
FIG. 10 is a cross-sectional view of the ring of FIG. 8, according to the cross-sectional plane X-X of FIG. 9.
Figure 11:
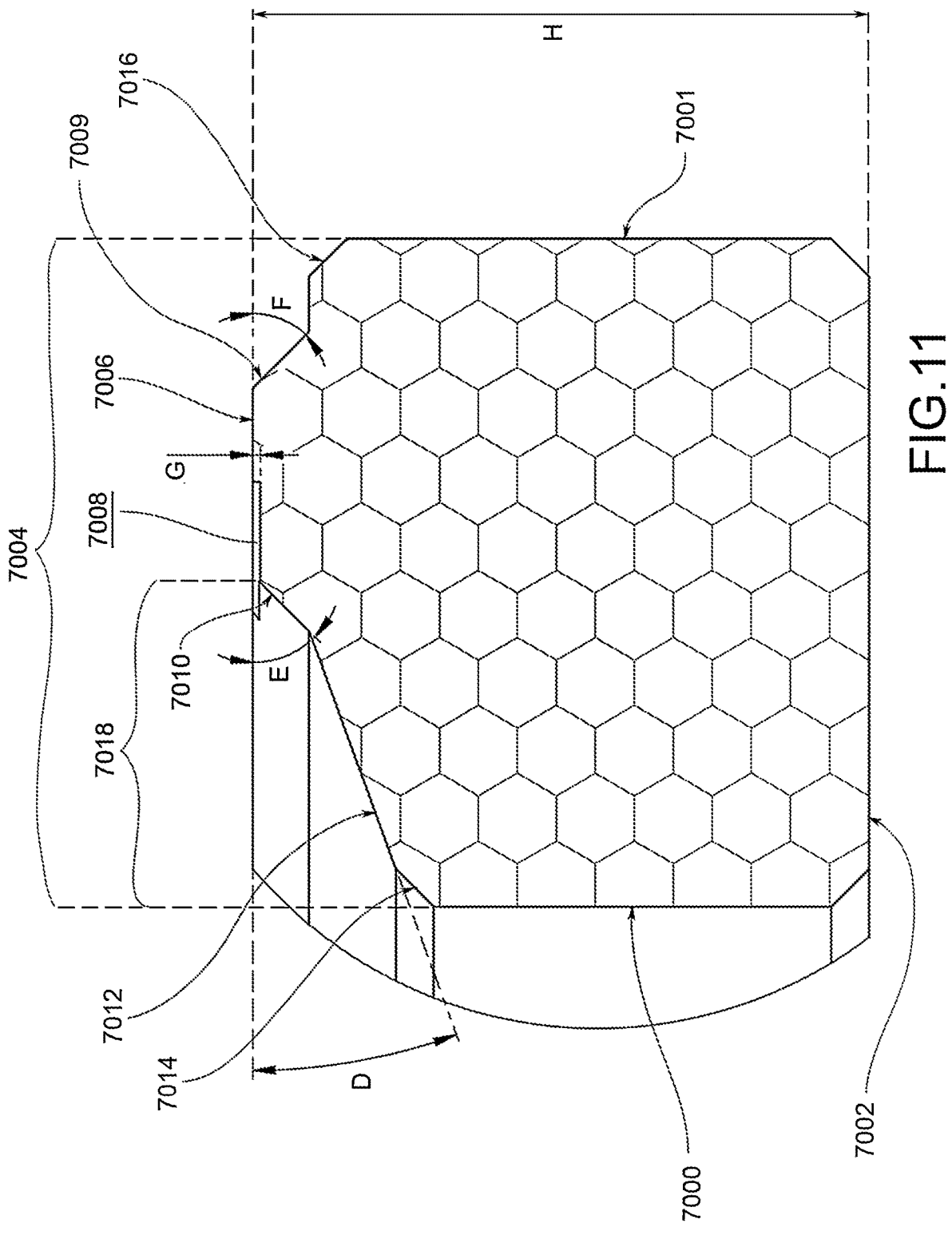
FIG. 11 is an enlargement of the box XI of FIG. 10.

The stationary ring 40 is preferably flat, i.e. it has a support face 4002, intended for resting against the upper support 36, and a contact face 4004, intended for contact with the rotating ring 70, which faces are substantially flat and orthogonal to the main axis Z and axially spaced (FIG. 7).

The rotating ring 70, on the other hand, is suitably shaped (FIGS. 8 to 11).

The rotating ring 70 has a cylindrical inner side face 7000, coaxial to the main axis Z, and a cylindrical outer side face 7001, coaxial to the main axis Z, placed radially externally to the inner side face 7000.

The rotating ring 70 also has a support face 7002, which is intended for resting against the lower sleeve 54, and is substantially flat and orthogonal to the main axis Z, and a contact face 7004, which is axially spaced from the support face 7002, and is intended at least partially for the contact with the stationary ring 40.

The contact face 7004 comprises a contact region 7006 that is flat and orthogonal to the main axis Z, having the shape of a circular crown, arranged at the top of the rotating ring 70. In other words, the contact face 7004 has a cross section generally tapered towards the contact region 7006, so as to reduce the contact area with respect to the support face 7002.

In particular, with reference to the position of the contact face 7004, the contact region 7006 is placed at an axial distance H which determines the height of the rotating ring 70. The contact region 7006 also has a predetermined inner diameter A' and a predetermined outer diameter A".

Preferably, moreover, the contact face 7004 comprises a plurality of grooves 7008 arranged on the contact region 7006, spaced circumferentially, preferably equally spaced. Each groove 7008 appears as a localized depression, like a handle, which is open towards the inside of the rotating ring 70, at the inner diameter A'. For example, they are provided in an even number, for example six evenly spaced grooves.

Preferably, each groove 7008 has a maximum radial extension C with respect to the inner diameter A'. In particular, the groove 7008 has a shape corresponding to a portion of a circle, for which the center of curvature CR lies on an imaginary diameter plane and the radius of curvature R defines the extension thereof.

Having defined an imaginary circumference Ci which circumscribes the grooves 7008, having a predetermined diameter B, said diameter B of the imaginary circumference Ci is between 30% and 70% of the outer diameter A" of the contact region 7006, i.e.:

$$30\% \le (B/A'') * 100 \le 70\%$$

Furthermore, each groove 7008 has a lowered portion G with respect to the contact region 7006, suitable for avoiding the jamming of hard particles dispersed in the drilling mud or, more generally, the stagnation of the drilling fluid.

Preferably, moreover, the contact region 7006 has a predetermined surface extension (Src), each groove 7008 has a predetermined surface extension Si and a predetermined number of grooves Ni is provided, so that the total surface extension of the grooves (Sti=Si*Ni) is greater than 8% of the surface extension of the contact region 7006 (Src), preferably greater than 9%, preferably equal to 10%, i.e.

$$(Sti/Src) * 100 = ((Si * Ni)/Src) * 100 \ge 8\%.$$

Preferably, moreover, the contact face 7004 comprises an annular, frusto-conical outer boundary surface 7009 which externally delimits the contact region 7006, is tapered towards the contact region 7006, and is inclined with respect to the latter by an angle F, preferably greater than 10° (F≥10°).

Preferably, moreover, the contact face 7004 comprises an annular, frusto-conical inner boundary surface 7010, which internally delimits the contact region 7006, is tapered towards the contact region 7006, and is inclined with respect to it by an angle E, preferably greater than 10° (E≥10°) and preferably equal to the angle F of the outer boundary surface 7009 (E=F).

Advantageously, the boundary surfaces, which are symmetrical with respect to the contact region, allow the balance value (a characteristic parameter of mechanical seals, which determines the value of the contact force between the surfaces in contact) to be kept practically constant as a function of wear.

Furthermore, the boundary surfaces, which together with the contact region make the rotating ring assume an overall isosceles trapezoidal shape (in which the contact region is the minor base), ensure a high resistance to the action of axial and radial forces.

Furthermore, preferably, the contact face 7004 comprises an annular, frusto-conical intermediate surface 7012 which is adjacent to the inner boundary surface 7010, tapered towards the contact region 7006 and inclined with respect to it by an angle D, preferably greater than 10° (D≥10°) and smaller than the angle E of the inner boundary surface 7010 or of the angle F of the outer boundary surface 7009 (D<E or D<F).

Finally, the contact face 7004 preferably comprises an inner bevel surface 7014 and an outer bevel surface 7016, both annular, frusto-conical and tapering towards the contact region 7006.

Lastly, the contact face 7004, between the contact region 7006 and the inner side face 7000, has an annular inner surface 7018, having a sliding course overall from the contact region 7006 towards the inside. Advantageously, this configuration favors the discharge of the drilling mud, mainly in stationary conditions of the drilling station.

Advantageously, the overall profile of the contact face has no sharp edges, for example at right angles, to avoid easy breakage.

Advantageously, moreover, the presence of the grooves, and the possible configuration of the profile of the inner surface, which favors the movement of the mud towards the grooves, greatly facilitates the lubrication between the surfaces in contact, i.e. between the contact face of the rotating ring and the contact face of the stationary ring.

According to a further advantageous aspect, the profile of the inner surface favors the cleaning of the contact area from possibly sedimented abrasive particles, avoiding an acceleration of wear due to these particles.

Innovatively, the joint according to the present invention, and in particular the rotating ring with which it is provided, meet the needs of the field and overcome the drawbacks mentioned with reference to the prior art.

According to an embodiment, the stationary ring is shaped according to that described above for the rotating ring and the rotating ring is shaped according to that described above for the stationary ring.

According to a further variant, both the rotating ring and the stationary ring are shaped as described above for the rotating ring.

According to an even further embodiment, the grooves are provided in an odd number.

According to a further embodiment, each groove has a shape corresponding to a portion of an ellipse.

It is clear that those skilled in the art, in order to satisfy current needs, may make modifications to the joint and to the rotating ring described above, said modifications all being contained within the scope of protection as defined in the following claims.

What is claimed is:

1. A sealing ring for a joint applicable to a stationary duct and to a rotating pipe of a drilling assembly, the sealing ring having a main axis and being delimited radially by an inner side face and an outer side face radially outside the inner side face, and axially by a support face and a contact face axially spaced apart from the support face, wherein the contact face comprises a contact region provided with a plurality of circumferentially arranged grooves, wherein each groove has a predetermined radial extension on the contact region, is axially lowered, and opens to the inner side face, wherein the contact face comprises an annular, frusto-conical inner boundary surface that internally delimits the contact region, is tapered towards the contact region, and is inclined with respect to the contact region by an angle (E), wherein the contact face comprises an annular inner surface between the contact region and the inner side face, the annular inner surface being angled from the contact region towards the inner side face, wherein the annular inner surface comprises an annular, frusto-conical intermediate surface that is tapered towards the contact region and inclined with respect to the contact region by an angle (D), and wherein the angle (E) of the inner boundary surface is greater than the angle (D) of the intermediate surface.

2. The sealing ring of claim 1, wherein the contact region is planar and orthogonal to the main axis and has a predetermined surface extension, and wherein a predetermined number of grooves is provided, each groove having a predetermined surface extension, such that a total surface extension of the grooves is greater than 8% of the predetermined surface extension of the contact region.

3. The sealing ring of claim 1, wherein the grooves are arranged diametrically opposite and angularly equally spaced.

4. The sealing ring of claim 1, wherein the grooves are angularly equally spaced and odd in number.

5. The sealing ring of claim 1, wherein each groove has a shape corresponding to a portion of a circle.

6. The sealing ring of claim 1, wherein each groove has a shape corresponding to a portion of an ellipse.

7. The sealing ring of claim 1, wherein the contact face comprises a section that is tapered towards the contact region to reduce a contact area.

8. The sealing ring of claim 1, wherein, having defined an imaginary circumference that circumscribes the grooves, having a predetermined diameter, said diameter of the imaginary circumference is between 30% and 70% of an outer diameter of the contact region.

9. The sealing ring of claim 1, wherein the angle (E) of the inner boundary surface is greater than 10°.

10. The sealing ring of claim 1, wherein the contact face comprises an annular, frusto-conical outer boundary surface that externally delimits the contact region, is tapered towards the contact region and inclined with respect to the contact region by an angle (F) greater than or equal to 10°.

11. The sealing ring of claim 10, wherein the angle (E) of the inner boundary surface is equal to the angle (F) of the outer boundary surface.

12. The sealing ring of claim 1, wherein the angle of the intermediate surface is greater than or equal to 10°.

13. The sealing ring of claim 1, wherein the sealing ring is made in one piece of a metal material, the metal material, by molding and chip removal, or of a ceramic material, by sintering of powders.

14. A ring assembly comprising:

the sealing ring of claim 1; and a ring holder supporting the sealing ring along the outer side face of the sealing ring.

15. A joint for fluidly connecting a stationary duct and a rotating pipe of a drilling station, the joint comprising at least one rotating sealing ring according to claim 1.

16. A joint for fluidly connecting a stationary duct and a rotating pipe of a drilling station, the joint comprising at least one stationary sealing ring according to claim 1.

17. A drilling assembly comprising:

a stationary duct for drilling mud;

a rotating pipe for feeding the drilling mud to a drilling head; and the joint of claim 15, fixed to the stationary duct and to the rotating pipe to obtain a sealed fluid connection.

18. A drilling assembly comprising:

a stationary duct for drilling mud;

a rotating pipe for feeding the drilling mud to a drilling head; and the joint of claim 16, fixed to the stationary duct and to the rotating pipe to obtain a sealed fluid connection.

* * * * *